US005552987A

United States Patent [19]

Barger et al.

[11] Patent Number: 5,552,987

[45] Date of Patent: Sep. 3, 1996

[54] AIRCRAFT ENGINE CYCLE LOGGING UNIT

[76] Inventors: Randall R. Barger, 1071 Donegan Rd., No. 473, Largo, Fla. 34641; Thomas V. Saliga, 4702 Baycrest Dr., Tampa, Fla. 33615

[21] Appl. No.: 278,081

[22] Filed: Jul. 20, 1994

[51] Int. Cl.[6] .................... G06F 17/40

[52] U.S. Cl. .................... 364/424.06; 364/424.04; 364/569; 340/971

[58] Field of Search .................... 364/424.03, 424.04, 364/424.06, 569, 550, 551.01; 73/583; 340/945, 971

[56] References Cited

U.S. PATENT DOCUMENTS

| | | | |
|---|---|---|---|
| 4,470,116 | 9/1984 | Ratchford | 364/424.06 |
| 4,729,102 | 3/1988 | Miller, Jr. et al. | 364/424 |
| 4,763,285 | 8/1988 | Moore et al. | 364/551.01 |
| 4,787,053 | 11/1988 | Moore | 364/551.01 |
| 4,970,648 | 11/1990 | Capots | 364/424.06 |
| 5,023,791 | 6/1991 | Herzberg et al. | 364/424.04 |
| 5,033,010 | 7/1991 | Lawrence et al. | 364/550 |
| 5,053,967 | 10/1991 | Clavelloux et al. | 364/424.06 |
| 5,060,156 | 10/1991 | Vajgart et al. | 364/424.03 |

*Primary Examiner*—Collin W. Park
*Attorney, Agent, or Firm*—David Kiewit

[57] ABSTRACT

A maintenance interval indication system, apparatus and method are provided that are cost-effective for general aviation aircraft and that may be retrofitted to existing airplanes. The system includes an on-board aircraft cycle counter and engine run-time and flight time logging instrument that requires no external transducers, no electrical signal inputs and only a single electrical power input from an airframe's electrical system. A microprocessor in the engine cycle logger accepts data input from an acoustic transducer and from a pressure transducer (i.e., altimeter), and correctly logs engine cycles in spite of factors such as: a) touch-and-go landings; b) in-flight engine shutdowns; c) noise from another engine on the same aircraft: d) wide variations in acoustic input levels from one engine to the next; e) changes in acoustic level following an overhaul of the monitored engine; f) transient noise artifacts; and g) transient altitude artifacts. Data from the cycle logging unit are communicated to a portable data collection device for subsequent off-board processing.

6 Claims, 4 Drawing Sheets

AIRCRAFT ENGINE CYCLE LOGGING UNIT

BACKGROUND OF THE INVENTION

The present invention provides apparatus retro-fittable to existing aircraft to collect data indicating when scheduled maintenance is needed.

Regular scheduled maintenance is mandated for a variety of aircraft equipment and components in the interest of safe operation. One of the most significant aircraft subsystems is an engine, which is subjected to varying levels of stress during the takeoff, climb, cruise, descent and landing segments of a flight. Most engine manufacturers, and the United States' Federal Aviation Administration, rate the service life of an engine according to a schedule that takes account of both the total number of cruise hours of operation and the number of flight cycles.

Historically, most aircraft engines have been maintained in accordance with run time and flight cycle data kept in hand-written logbooks. Such records are subject to both human error (which can result in a premature overhaul) and to deceit, which can be motivated by the high cost of overhauling an engine.

For several decades aviation specialists have pursued the development of systems for automated logging of flight operations. The resultant Airborne Integrated Data Systems have been built into large commercial transport aircraft and have provided requisite maintenance data, although not in a way that has proven to be cost effective in general aviation. These AID systems are commonly characterized by a large number of transducers, a complex wiring network for communicating with these transducers, and a central controller. Installation of these systems is most economically performed at the time of original manufacture of the aircraft, because of the need to run a network of wires, cables or optical fibers throughout the entire airframe. Notable among AID systems are:

Miller et al in U.S. Pat. No. 4,729,102, who teach a system integrable with flight recorders required on some aircraft. Miller et al's system measures a wide variety of engine (e.g. combustion pressures), flight (e.g. altitude) and airframe (e.g. "weight-on-wheels") parameters and also accepts manual data (e.g. takeoff weight). Their system provides out-of-range alarms and detailed operational data. Elapsed flight time and flight cycles are calculable from data their system logs.

Hertzberg et al, in U.S. Pat. No. 5,023,791, and Brooks et al in U.S. Pat. No. 5,111,402, provide teaching on the use of complex aircraft data acquisition systems and of associated ground-based automatic test equipments used during maintenance.

Lawrence et al., in U.S. Pat. No. 5,033,010, disclose an aircraft engine monitoring system in which a computer memory module is permanently attached to a monitored engine. Engine operating data are stored in the memory module by a physically separate engine control unit. Permanently associating the EEPROM data storage device with the engine ensures that a lifetime data log can be maintained in permanent association with the engine even if the engine is moved to a different aircraft or if the engine control unit is changed.

Simpler systems to monitor engine operation and indicate required maintenance are found in the automotive art. Notable among these is U.S. Pat. No. 5,060,156, wherein Vajgart et al teach a system indicating when to change the oil in an engine sump. Vajgart et al's system, when applied to a modern automobile with a computer that controls the engine, uses additional software, but requires the addition of no hardware other than an oil temperature sensor.

SUMMARY OF THE INVENTION

It is an object of the invention to provide maintenance interval indication system, apparatus and method that are cost-effective for general aviation aircraft.

It is a further object of the invention to provide a system for maintenance interval indication that is retro-fittable onto existing aircraft.

It is an additional object of the invention to provide a maintenance indication system that does not rely on physical data communication means cabled into an airframe.

It is yet a further object of the invention to provide an aircraft cycle counter, engine run-time and flight time logging instrument requiring no external transducers, no electrical signal inputs and only a single electrical power input from an airframe's electrical system.

It is additionally an object of the invention to provide an aircraft engine maintenance-interval indicating system and method that is tamper resistant, and that provides indication of an attempt to avoid logging engine operating parameters.

It is a further object of the invention to provide an aircraft engine cycle logger in which a computer accepts data input from an acoustic transducer and from a pressure transducer (i.e., altimeter), and correctly logs engine cycles in spite of: a) noise from another engine on the same aircraft; b) wide variations in acoustic input levels from one engine to the next; c) changes in acoustic level following an overhaul of the monitored engine; d) transient noise artifacts; and e) transient altitude artifacts.

It is a specific object of the invention to provide an aircraft engine cycle logger that records a correct number of engine cycles for an aircraft used for touch-and-go landings, It is an additional specific object of the invention to provide an aircraft engine cycle logger that is not affected by in-flight restarts of a monitored engine.

DETAILED DESCRIPTION

Figure 1:
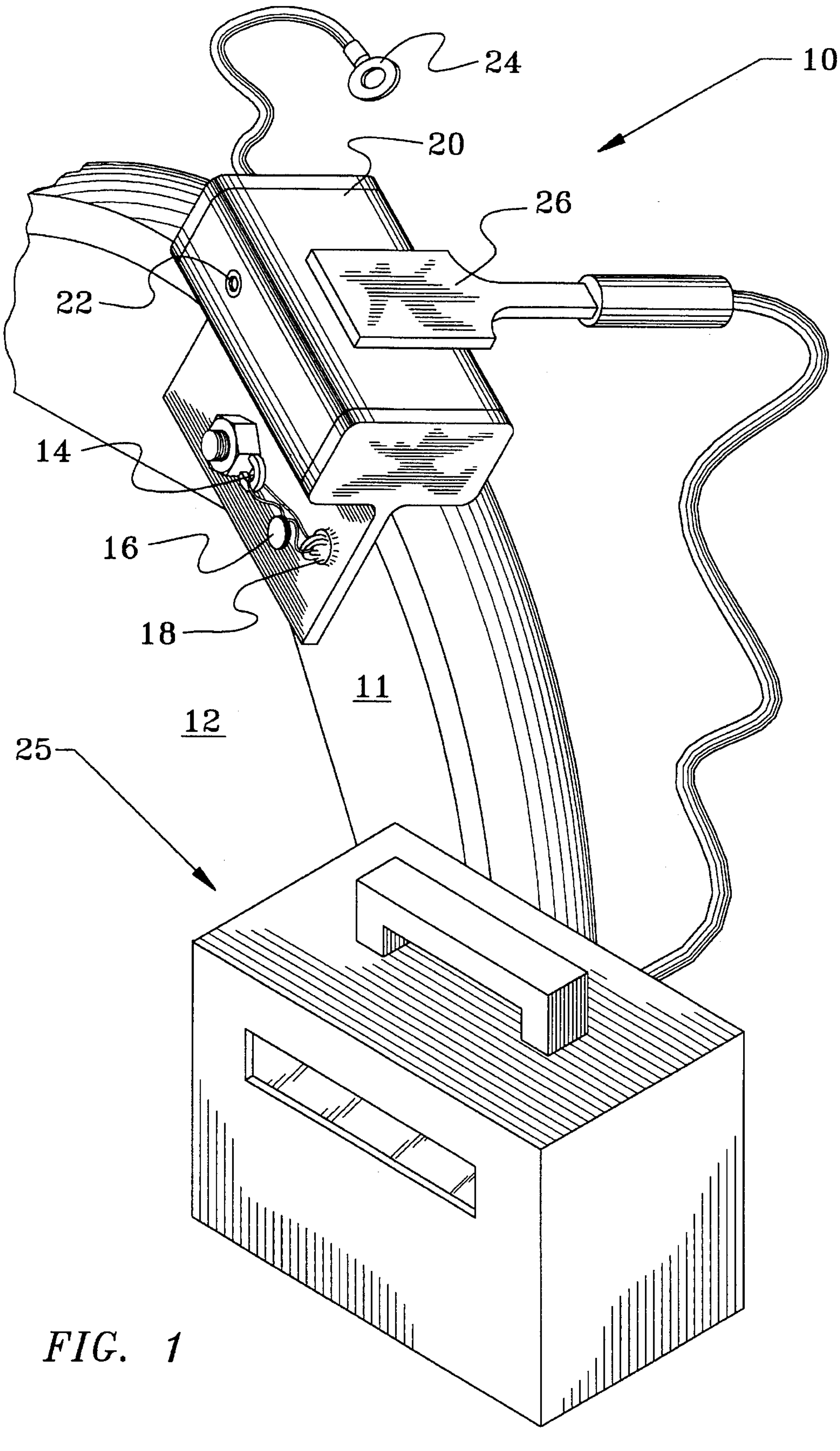
FIG. 1 of the drawing is an elevational view of an on-board monitoring instrument of the invention installed to an aircraft engine flange. This figure also shows a non-contact readout probe used to collect data from the instrument.

Turning initially to FIG. 1 of the drawing, one finds an on-board cycle logging instrument 10 bolted to a flange 11 of an aircraft engine 12 by a security nut 14 including a seal attachment loop. A well known tamper-indicating seal 16 is shown threaded through a ring on the nut 14 and through a loop or ring portion 18 of the housing 20 of the logger 10, so that unbolting the logger 10 from the engine 12 destroys the frangible seal element 16.

The preferred instrument 10 combines measurements of barometric pressure, engine vibration (i.e., acoustic output), elapsed time, and the operating voltage of the aircraft's power supply. The barometric pressure (altimeter) input is provided via a pressure port 22 in the case 20. Those vibratory signals from an operating engine 12 that lie in a selected acoustic frequency band are picked up by a microphone (not shown in FIG. 1) that is preferably bonded to the metal case 20 to ensure optimal acoustic coupling. Horological measurements are made with a solid state clock (also within the case 20 and not shown in FIG. 1). The aircraft's electrical power supply voltage is measured by a single wire connection 24 to the energized or "hot" side (which is electrically positive in a usual negative ground airframe system) of the aircraft power supply. The second electrical connection is made to the aircraft chassis ground by the fastener 14 that holds the metal case 20 to a conducting portion of the engine 12.

As further indicated in FIG. 1, data from the cycle logger 10 may be periodically collected by a known non-contact inductive wand 26 (e.g., as taught by Vinding in U.S. Pat. No. 3,299,424, the disclosure of which is herein incorporated by reference). As is well known in the art of data collection, other portable data collection means for reading data from the logger 10 and transporting the data to a computer for subsequent processing and evaluation could include a multi-conductor serial port connection to the instrument 10. Alternately, the apparatus could use infrared LED/phototransistor pairs or low power RF transceivers both in the readout means 25 and in the instrument 10 to permit communication of data between the two units.

Figure 2:
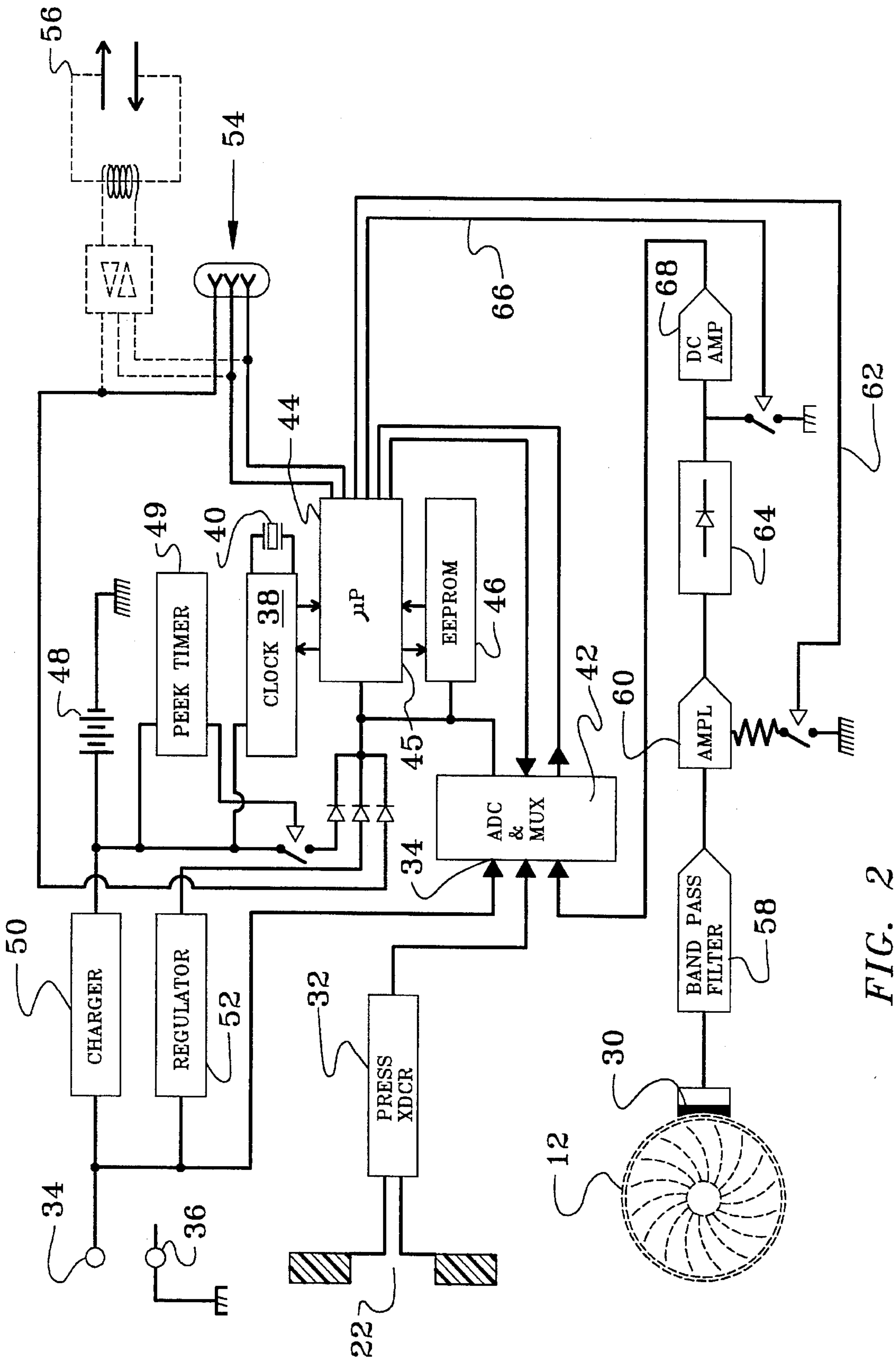
FIG. 2 of the drawing is a schematic block diagram of the electronic circuitry employed by an engine cycle logger of the invention.

Turning now to FIG. 2 of the drawing, one finds a schematic of preferred circuitry used in a cycle logger of the invention. Inputs to the cycle logging logic are provided by: a contact microphone 30; a barometric pressure transducer 32; electrical connections 34, 36 to the aircraft's battery voltage and chassis ground, respectively; and a clock 38.

The contact microphone 30, which may be a Model KBI-1541 piezo-ceramic bender made by Projects Unlimited, is acoustically bonded to the monitored engine 12 in accordance with well established methods. The microphone 30 provides an acoustic indication that the engine is running.

The barometric pressure transducer 32 may be a Model SCC15A made by SenSym Inc. The use of such a transducer and an associated microprocessor is a well known means of providing an aircraft altimeter function.

The electrical connections 34, 36 to the aircraft's battery voltage and chassis ground, respectively, provide a means of determining when electrical power from the aircraft's main power supply system has been turned on, as well as a means of powering the instrument.

The clock 38 may be a Dallas Semiconductor Model DS 1202 digital clock chip used with an external crystal 40, which may be a Seiko DS-VT-200, oscillating at thirty two kilohertz. The use of such a digital clock as a timekeeping means is well known in the art of computer-based data collection system for providing time-stamped records.

Analog signals representative of engine vibration (from the microphone 30), altitude (from the pressure transducer 32) and airframe electrical system voltage (from voltage sensing lead 24) are digitized by an analog-to-digital converter 42 (which may preferably be a Texas Instruments type TLC1541) and thereafter supplied as inputs to a microprocessor 44 that controls the various operations of the instrument, as will be described subsequently. The microprocessor 44, which includes random access computer memory (RAM) 45, may preferably be an Intel 80C31. The microprocessor 44 stores data in an external EEPROM 46, which may be a Catalyst Semiconductor Inc. type CAT35C116, which has a non-volatile data storage capacity of 16,384 bits.

The cycle logger is preferably powered from a rechargeable battery 48, which may comprise a six volt string of Varta V60RT Ni-Cd button cells. When the aircraft engine is operating, the battery 48 is recharged by a battery charger 50 powered by contacts 34, 36 to the aircraft's main electrical power system, and power to the cycle logger is supplied from the aircraft mains via a voltage regulator 52. When the aircraft is taken out of service and data have been logged into a non-volatile memory, as will be subsequently herein discussed, the monitoring equipment is turned off and only the real time clock components 38, 40 and a separate 'peek' timer 49 are powered. The peek timer 49, which may be a Motorola MC14541B, is reset whenever the aircraft's battery power is removed, and is thereafter used to power up the instrument for a one second 'peek' (during which interval the microprocessor 44 looks for anomalous conditions) at intervals of about one hour. An attempt to operate the aircraft with a disconnected cycle logger might be detected, for example, if a periodic peek finds an engine running (e.g., as indicated by the acoustic signal) while the apparent aircraft power supply voltage is zero.

Output from the cycle logger 10 may be collected by various means known to the art. These include making occasional physical connection to an external computer via a serial port 54, or using an inductive coupling 56, which is shown in phantom in FIG. 2.

Although the time, voltage and altitude inputs to the microprocessor 44 are handled in ways well known in the measurement art, this is not the case for the acoustic input. The acoustic measurement encompasses a wide range of vibratory signal levels extending over three orders of magnitude (as measured by the peak-to-peak voltage at the microphone 30). The capability of dealing with this wide dynamic range is provided by various acoustic preprocessing components to ensure an input that fits within the five volt full scale range of the A/D converter 42. This is done in the presence of noise that has a bandwidth of twenty kilohertz and an intensity of up to ten volts peak-to-peak.

Acoustic signals from the microphone 30 are input to a bandpass filter 58 designed to enhance the ratio of monitored engine signal to adjacent engine signal. A satisfactory filter 58 has been found to be one that has a gain roll off of twelve dB per octave at frequencies below five hundred Hz, a six dB/octave gain increase from five hundred Hz to seven thousand Hz, and a six dB/octave roll-off at frequencies above that point. After the acoustic signals are filtered, they are then amplified by a bi-level amplifier 60. The gain of amplifier 60 may be increased from its lower level to a setting that is eight times higher when the microprocessor 44 outputs a logical HIGAIN signal on line 62, as will subsequently be discussed with regard to the control algorithm of the microprocessor 44. The output of the amplifier 60 is detected by detector 64 (which is reset via SONRES1 line 66 from the microprocessor 44 during initialization of the measurement algorithm). The detected amplitude is amplified by a fixed-gain DC amplifier 68 and is input to the ADC 42.

Figure 3:
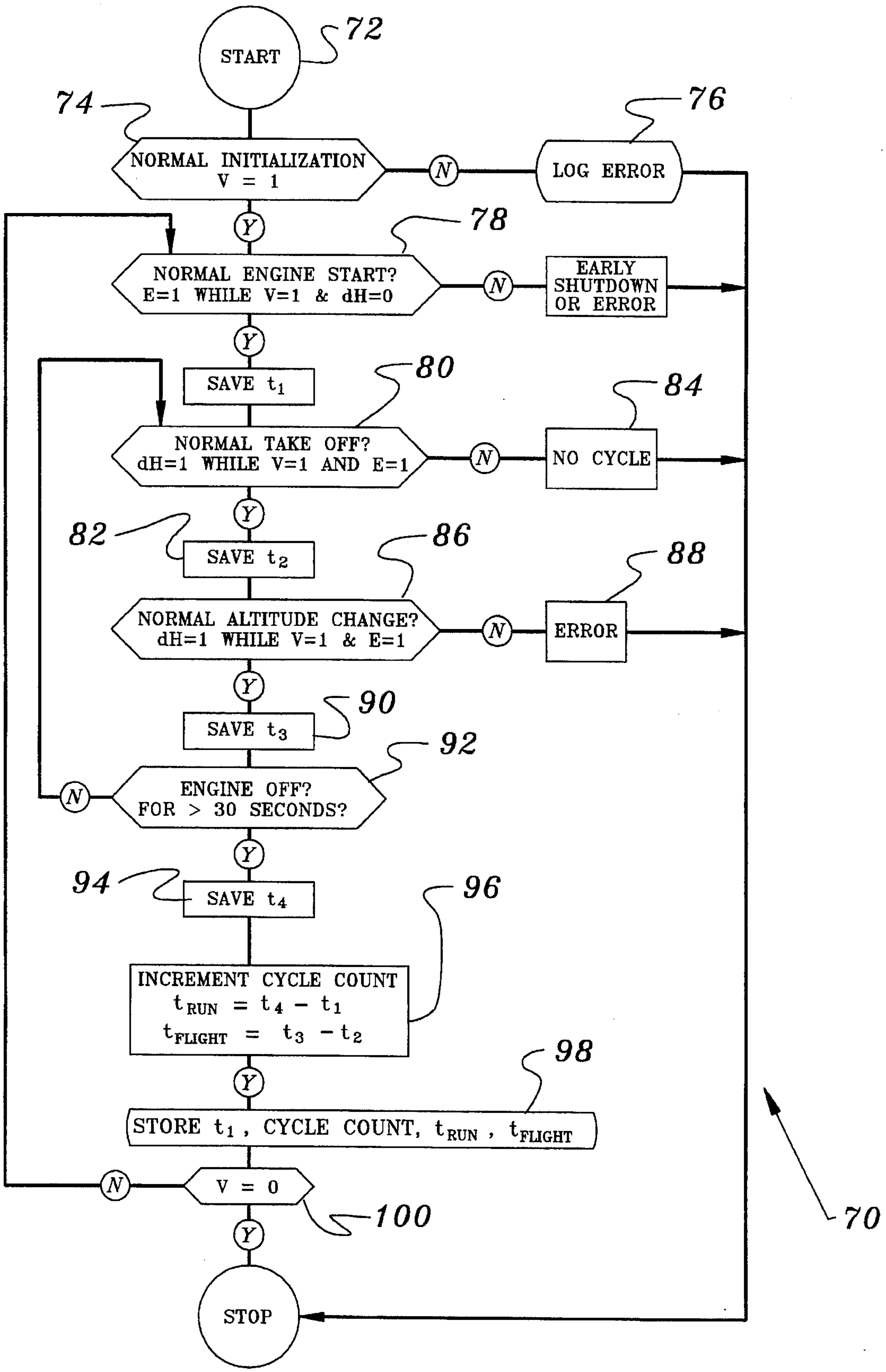
FIG. 3 of the drawing is a logical flow chart illustrating the main control loop of the computer shown in FIG. 2.

The measurement operations of the cycle logger 10 may be understood with reference to the main control loop 70, which is shown as a flow chart in FIG. 3 of the drawing. When the aircraft is not in service, the circuitry of FIG. 2 is shut down, save for the time-keeping functions which may consume as little as 10 μA. The instrument is turned on when a measurement is needed; at an operator-selected time to communicate with an external data collection computer (not shown in FIG. 3); or to perform a periodic 'peek' security check (not shown in FIG. 3).

The main control loop 70 is entered (in step 72) whenever the power supply voltage 34 exceeds a predetermined threshold value (indicated by the logical designation "V=1"). The measurement system is initialized (step 74), which includes the above-noted resetting of the amplifier 60 as well as other error and security status checks. An apparently illogical status, such as having the engine running before the power was turned on, or having an appreciable altitude change with the power or engine off causes an error message to be recorded in the EEPROM 46 as shown in Step 76. Such error messages may indicate defective equipment, or, as previously discussed with respect to the peek timer 49 and its use, may indicate an attempt to tamper with the monitoring system and to operate the aircraft without logging a cycle.

If the acoustic output level exceeds a predetermined threshold (a status noted by "E=1" in FIG. 3) while the power supply stays on and before a change occurs in the indicated altitude (noted as "dH=0" in FIG. 3), a normal engine start is noted in Step 78 and the current clock time, $t_1$, is saved in microprocessor RAM 45 for later use in determining engine run time. The power supply may be turned off prior to engine start (e.g. as might occur during a maintenance check), in which case no data are logged and the process is stopped. Measurement errors or security events may also occur, in which case an message is logged and the process stops.

Following a normal engine start (Step 78), the control loop progresses to Step 80 where one expects to find either a normal take off, or a 'no-cycle shutdown'. A normal take off is indicated by a change in altitude of more than a preset amount (which is indicated as "dH=1") while the power supply and the engine are on. As noted in Step 80, a normal takeoff calls for the system to save the current clock time, $t_2$, as the take-off time (Step 82). If the start-up is not followed by a take-off (e.g., if an aircraft is started only to taxi it into a maintenance hangar or to a fuel pump) no data are logged, as indicated in Step 84.

A lower limit (e.g., 150 m) is set on the absolute value of the altitude change that occurs within a predetermined time interval (e.g., 4 minutes) in order to decide that dH=1. This choice of threshold allows for minor instrument drifts and for thermal errors. For example, a 35° C. change in ambient temperature is enough to generate a change in the output of the pressure transducer 32 corresponding to an altitude change of about 60 m. Moreover, the use of the absolute values of pressure changes in the preferred algorithm allows for anomalous situations, such as a takeoff from a mountaintop airport.

The preferred algorithm also requires a degree of stability in the measured altitude change. A transient pressure change indicative of more than 150 m change in altitude may be induced, for example, by slamming an engine compartment door while the aircraft is on the ground. To avoid such altitude artifacts, the preferred algorithm stores sequential altitude measurements and requires there be no more than a maximum variation within a substring (e.g., three sequential values should be within five ADC units of each other) before using one of these values. Transients can thus be disregarded, and faults producing unstable readings can be logged.

During the course of a flight, a number of altitude changes are to be expected. The last of these normally occurs at touchdown. Thus, as shown in Steps 86–92, a new value of $t_3$ is saved in buffer memory after each altitude change of 150 m. If the engine is turned off for more than 30 seconds (an interval selected to keep in-flight restarts from contributing fallacious data), as is indicated in Step 92, the current value of t3 is used to compute the flight time. Requiring both an altitude change and an engine shut-down ensures that 'touch-and-go' practice landings do not count as flight cycles.

When the engine is turned off at the end of a cycle, the 'on' time, $t_1$, and the 'off' time, $t_4$, are saved, the cycle count is incremented, and the run time ($t_{run}=t_4-t_1$) and flight time ($t_{flight}=t_3-t_2$) are calculated. These data are stored in the non-volatile EEPROM memory 46 as indicated in Steps 94–98. If the aircraft's battery voltage drops below the threshold (Step 100), the main loop ends, the peek timer is reset, and the non-timekeeping portion of the measurement system is shut down. In some cases (e.g., a twin engine aircraft lands, shuts off one engine while disembarking a passenger, then restarts that engine and takes off for another leg of the overall flight), the V=1 logical state persists after E=0 for the monitored engine and the algorithm proceeds from engine restart in Step 78.

Figure 4:
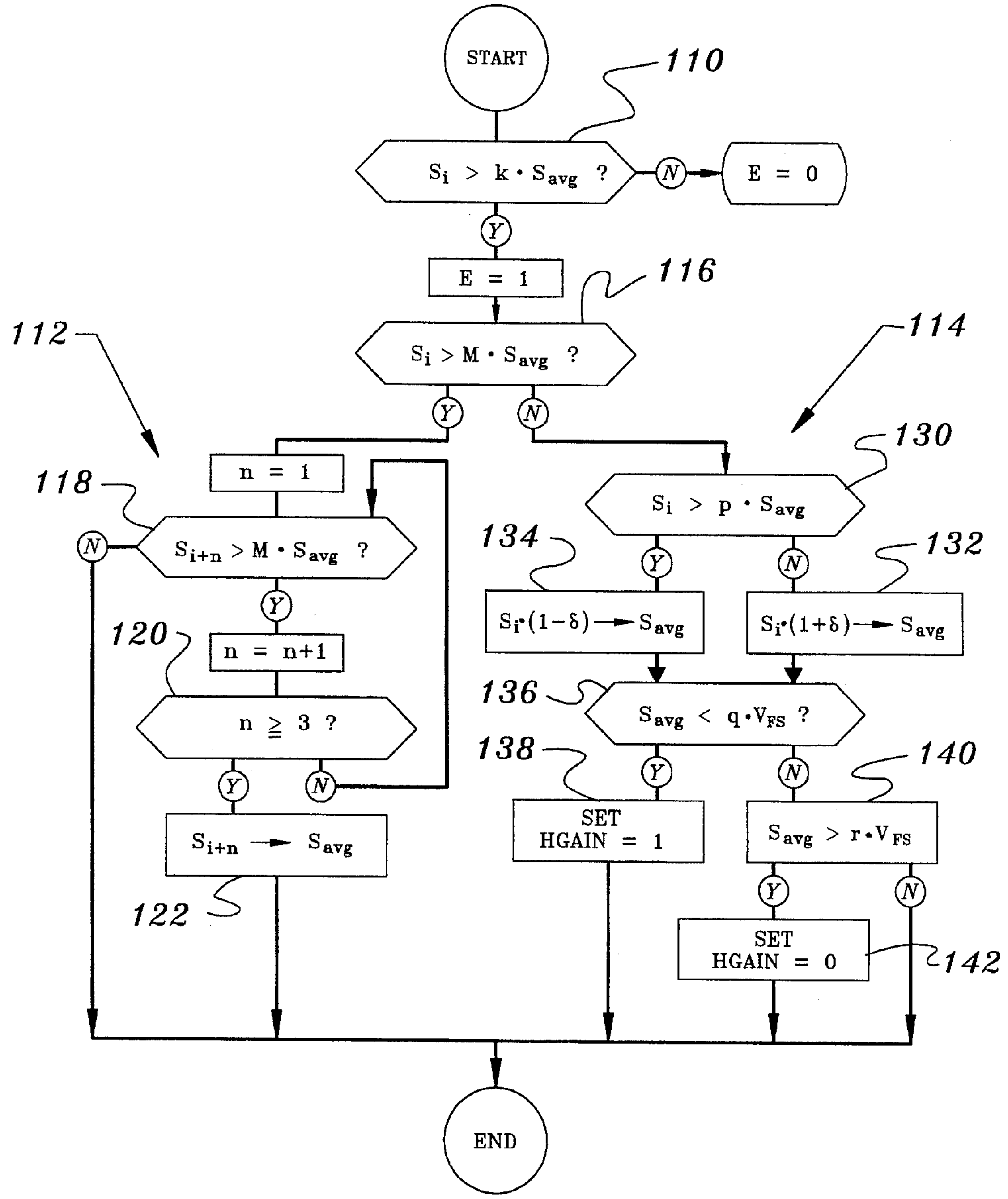
FIG. 4 of the drawing is a logical flow chart illustrating adaptive logical processing of acoustic power levels.

As noted previously herein, particular care is needed to ensure that the 'engine on' status (logical state E=1) is properly reported. A signal is always generated by a microphone attached to one engine of a multi-engine aircraft when another engine is running. Indeed, experiments have indicated that when one engine of a twin-engine airplane is running, the signal measured by a microphone attached to the other engine may be between 15 and 20% of what would be measured if the monitored engine were running. Moreover, the signal level from a given engine changes significantly over time. A sudden increase in signal level (which may indicate a need for immediate repairs), might be followed by a subsequent abrupt drop in signal level measured after the engine is overhauled and put back into service. Adapting the instrumentation to address arbitrary variations in acoustic signal level is an important part of the subject invention that may be better understood with reference to FIG. 4 of the drawing.

The preferred adaptive acoustic decision threshold algorithm decides when the engine has begun operating and sets E=1 when the ith measurement of acoustic intensity, $S_i$, exceeds a fraction, k, of the average acoustic intensity, $S_{avg}$, which is stored in computer memory (In one version of the algorithm, k=0.32). Whenever 'engine start' is detected, as shown in Step 110, the adaptive algorithm tests the degree to which the threshold is exceeded and then enters either a 'fast attack' loop 112 or a 'slow track' loop 114 depending on whether or not $S_i > M\ S_{avg}$, as shown in Step 116 (M =2 in a preferred case). If the condition in Step 116 is satisfied, the algorithm tests for a spurious input by requiring that three sequential samples satisfy the condition (e.g., as shown in Steps 118, 120) and then replaces the existing value of $S_{avg}$ with the new, higher value. This 'fast attack' adaptation allows a newly installed cycle logger to quickly set an appropriate threshold level and thereby ensure a minimum number of 'false on' indications. One would expect, for example, that a new cycle logger (e.g., one monitoring a new engine that was installed to replace a defective engine on a twin-engine aircraft) would set E=1 erroneously if the other engine on the aircraft was started first. But, after one false indication, the threshold would rise rapidly to a sustained value so that on subsequent cycles starting the adjacent engine will not set E=1.

Because of the multiplicity of sonic signal sources, a correspondingly fast adaptation is not practical for lowering thresholds. Turning again to FIG. 4 of the drawing, one finds a slow tracking approach that may be used to adapt the system to a falling signal level. If $S_i$ is greater than $pS_{avg}$ but less than $MS_{avg}$ (where preferred values for p and M are 1 and 2, respectively) as is indicated in Steps 116, 130 and 132, the value of $S_{avg}$ is increased by a fraction δ (which may be 1–5% of the previous value of $S_{avg}$). On the other hand, if $S_i$ is less than both $pS_{avg}$ and $MS_{avg}$ (as indicated in Steps 116, 130 and 134) the value of $S_{avg}$ is decreased by δ. Subsequent comparisons between the new value of $S_{avg}$ and the full-scale voltage eutput, $V_{FS}$, of the amplifier 60 are used to set the HGAIN output of microprocessor 44, as shown in Steps 136–142 (where a preferred value for q in Step 136 is 0.08, and a preferred value for r in step 140 is 0.90).

The slow tracking loop 114 adapts the system to a decreased threshold. In a case of particular interest, when the acoustic output from a monitored engine initially increases (indicating a need for maintenance) and then drops drastically after an overhaul, the slow tracking algorithm illustrated in FIG. 4 would cause the cycle logger 10 to miss several operational cycles before the threshold for setting E=1 was low enough to allow accurate operation.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

We claim:

1. In an aircraft monitoring system comprising a microprocessor operatively connected to a non-volatile memory containing as a record therein a current flight cycle count, to a buffer memory, to an altitude transducer, to an acoustic transducer, to an airframe power supply voltage input, and to a timekeeping means, a method of determining an occurrence of a flight cycle, said method comprising the steps of:

a) determining a first time at which said voltage input exceeds a predetermined voltage value, and storing at said first time in said buffer memory a first value representative of an output of said altitude transducer, b) determining a second time, after said first time, at which said acoustic output exceeds a predetermined acoustic value, c) determining a third time, after said second time, at which said output from said altitude transducer differs from said first output by a predetermined altitude value and storing said third time in said buffer memory, d) determining a fourth time, after said third time, at which said output from said acoustic transducer falls below said predetermined acoustic value, and e) incrementing said flight cycle count responsive to said determination of said fourth time.

2. The method of claim 1 further including an algorithm for calculating a cycle run time comprising the steps of:

f) storing said first and said fourth times in said buffer memory, g) calculating, after step e), the difference between said fourth and said first times, and h) storing said difference in said non-volatile memory as said cycle run time.

3. The method of claim 1 further including an algorithm for calculating a flight time comprising the steps:

f) storing said second time and said third time in said buffer memory, g) calculating the difference between said third and said second times, and h) storing said difference in said non-volatile memory as said flight time.

4. The method of claim 1 further comprising an adaptive threshold algorithm executed after step b) therein and before step c) therein, said adaptive threshold algorithm comprising the additional steps of:

b) i) comparing said acoustic output with said predetermined acoustic value, and b) ii) replacing said predetermined acoustic value with said acoustic output if said acoustic output exceeds said predetermined acoustic value by a second predetermined amount.

5. The method of claim 1 further comprising an adaptive threshold algorithm executed after step b) therein and before step c) therein, said adaptive threshold algorithm comprising the additional steps of b) i) determining that said acoustic output is less than a first predetermined fraction of said predetermined acoustic value and b) ii) decrementing said predetermined acoustic value by a second predetermined fraction of said predetermined acoustic value.

6. The method of claim 1 further comprising an adaptive threshold algorithm executed after step b) therein and before step c) therein, said adaptive threshold algorithm comprising the additional steps of b) i) comparing said acoustic output with said predetermined acoustic value, b) ii) replacing said predetermined acoustic value with said acoustic output if said acoustic output exceeds said predetermined acoustic value by a predetermined amount, or b) iii) decrementing said predetermined acoustic value by a first predetermined fraction thereof if said acoustic output is less than a second predetermined fraction of said predetermined acoustic value.

* * * * *